US012789908B2

(12) United States Patent
Lopez et al.

(10) Patent No.: US 12,789,908 B2
(45) Date of Patent: Nov. 10, 2026

(54) OPTIMIZED VEHICLE HOOD FOR IMPACT PROTECTION

(71) Applicant: Rivian IP Holdings, LLC, Irvine, CA (US)

(72) Inventors: Alfonso Marquez Lopez, Newport Beach, CA (US); Jerry Faber, South Lyon, MI (US); Vamsi Charan Pulugurtha, Aliso Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 511 days.

(21) Appl. No.: 18/239,952

(22) Filed: Aug. 30, 2023

(65) Prior Publication Data

US 2024/0051608 A1 Feb. 15, 2024

Related U.S. Application Data

(63) Continuation of application No. 17/375,899, filed on Jul. 14, 2021, now Pat. No. 11,772,710.

(51) Int. Cl.
*B62D 25/10* (2006.01)
*B60R 21/34* (2011.01)
*B62D 25/12* (2006.01)

(52) U.S. Cl.
CPC ............ *B62D 25/105* (2013.01); *B60R 21/34* (2013.01); *B62D 25/12* (2013.01); *B60R 2021/343* (2013.01)

(58) Field of Classification Search
CPC ...... B62D 25/105; B62D 25/12; B60R 21/34; B60R 2021/343
USPC .................................................... 296/193.11
See application file for complete search history.

(56) References Cited

U.S. PATENT DOCUMENTS

| | | | | |
|---|---|---|---|---|
| 8,662,571 B2 * | 3/2014 | Grattan | B62D 25/105 296/193.11 |
| 11,772,710 B2 * | 10/2023 | Lopez | B62D 25/12 296/193.11 |
| 2015/0001888 A1 * | 1/2015 | Kalargeros | B62D 25/12 296/193.11 |

FOREIGN PATENT DOCUMENTS

| | | | | |
|---|---|---|---|---|
| CN | 109649502 A | 4/2019 | |
| DE | 102005036171 A1 * | 2/2007 | B62D 25/105 |
| DE | 102017011549 A1 * | 7/2018 | B62D 25/12 |
| FR | 2935938 A1 | 3/2010 | |

* cited by examiner

*Primary Examiner* — Wenwei Zhuo
(74) *Attorney, Agent, or Firm* — HG LAW LLP

(57) ABSTRACT

Systems and methods are presented herein for providing a reinforcement structure to reduce a Head Impact Criteria value associated with an object impacting a hood assembly that comprises the reinforcement structure. The reinforcement structure is arranged between an outer hood structure and an inner hood structure. The reinforcements structure comprises a main reinforcement and a reinforcement extension configured to extend laterally away from the main reinforcement. The reinforcement extension comprises a rib structure configured to accommodate an upper profile of a rigid front fascia feature and a rear flange configured to extend rearward over the rigid front fascia feature. The reinforcement extension is structured to be stiff enough to deform in a manner that reduces the amount of time an impacting structure reaches a peak acceleration value while also reducing the achievable peak acceleration value.

19 Claims, 7 Drawing Sheets

OPTIMIZED VEHICLE HOOD FOR IMPACT PROTECTION

CROSS-REFERENCE TO RELATED APPLICATIONS

This application is a continuation of U.S. application Ser. No. 17/375,899, filed Jul. 14, 2021, the entire contents of which is hereby expressly incorporated by reference herein in its entirety.

INTRODUCTION

The present disclosure is directed to systems and methods for providing an optimized vehicle hood structured to protect impacting objects, and more particularly, to systems and methods that provide an inner reinforcement at the front end of a vehicle hood to reduce Head Injury Criterion ("HIC") values and ensure repeatable performance.

SUMMARY

Vehicle hood assemblies comprise an outer surface, an inner support structure, and one or more reinforcements in accordance with the present disclosure. Each of these elements are structured to enable the hood assembly to be stiff enough to remain a rigid body as the vehicle moves and experiences wind resistance or translates over rough terrain while also being structured to deform in a manner that reduces damage experienced by objects that impact the hood assembly. In some embodiments, the outer surface of the hood assembly is structured to sit at an offset above structures positioned below the outer surface (e.g., 50-150 mm). The inner support structure is structured such that the inner support structure may be fixedly attached to an underside of the outer surface. The inner support structure comprises a plurality of cutouts which reduce stiffness of the inner support structure to allow the hood assembly to deform when subjected to an impact from an object. Attached to either the bases of the plurality of cutouts of the inner support structure or attached to the bodies of rib structures in the inner support structure formed by the cutouts may be one or more reinforcements. A reinforcement may be arranged relative to features in the inner hood structure that accommodate rigid vehicle fascia features (e.g., a headlight frame or profile) which, if impacted by an object, will yield substantial damage to the impacting object.

In some embodiments, the reinforcement is structured and positioned to prevent an object, that impacts the outer surface of the hood assembly, from deforming the front portion of the hood assembly proximate to a front edge of the hood assembly to a point where the object compresses the outer surface and makes contact with a fascia feature that has an elevated stiffness (e.g., the headlight frame or profile). Proximate, in this context, means within a threshold vertical distance. For example, the top of the headlight frame or profile may be positioned to be below the bottom surface of the reinforcement by a distance of 50-150 mm. Some approaches utilize an outer surface and an inner support structure, but lack strategically structured and positioned reinforcements to reduce the acceleration of objects impacting the hood assembly so as to reduce the likelihood the object will experience damage from impacting a portion of the rigid fascia feature with elevated stiffness (e.g., are unable to deform in a manner which is below a HIC threshold value and cannot adequately influence the acceleration of an impacting object to reduce damage to the impacting object). Additionally, other approaches to hood assemblies comprise a complex release mechanism to offset the acceleration of an impacting object. These approaches rely on rapid expansion of airbag assemblies or surfaces supported by springs which act to catch and redirect an impacting object's momentum leading to an increasingly complex assembly with increased weight.

These and other deficiencies are addressed by the exemplary vehicle hood assemblies and reinforcement structures described herein, in which, for example, a reinforcement structure is positioned proximate to a rigid fascia feature to redirect an impacting object's acceleration away from rigid fascia feature (e.g., the bottom surface of the reinforcement structure is within 150 mm of the top surface of the rigid fascia feature). In some embodiments, a vehicle hood reinforcement structure comprises a main reinforcement configured to be arranged between an outer hood structure and an inner hood structure and a reinforcement extension of the main reinforcement configured to extend laterally away from the main reinforcement. The reinforcement extension comprises a rib structure configured to accommodate an upper profile of a rigid front fascia feature and a rear flange configured to extend rearward from the rib structure over the rigid front fascia feature. The thickness of the rib structure is determined based on threshold deformation criteria (e.g., HIC values corresponding to a maximum allowable change in acceleration corresponding to an object on a trajectory to impact and deform a vehicle hood). For example, the threshold deformation criteria may be determined based on an area under an acceleration curve for an object impacting a hood assembly or may be based on a maximum acceleration determined based on an acceleration curve for an object impacting a hood assembly. Based on the area under the curve or the maximum value determined from the curve, the thickness may be correlated such that the area under the curve does not exceed a particular value or the peak acceleration does not exceed a particular value.

These techniques solve the problems of other approaches described above. In particular, this approach does not rely on either the outer surface or inner hood structure of the vehicle hood to absorb energy from an impacting object or deform in response to being impacted by the object. Instead, the reinforcement structure is fixedly attached between the inner hood structure and outer hood structure and is positioned relative to a rigid fascia feature (e.g., a headlight frame or profile) adding material capable of absorbing or redirecting the momentum of the impacting object to prevent the impacting object from compressing a hood assembly to make contact with the rigid fascia feature. As the outer surface deforms towards the inner hood structure as a result of an impact, the reinforcement structure receives the impact and may deform to alter the acceleration of the impacting object or redirect the trajectory of the impacting object away from the rigid fascia feature. Thus, the reinforcement structure is positioned and structured to inhibit contact between an impacting object and the rigid fascia feature.

Additionally, this approach does not require a substantially rigid outer surface of the hood assembly. Although it is useful to have a sufficiently rigid outer structure of the hood to prevent deformation from a user gripping and pressing the hood assembly into a closed position over a vehicle bay (e.g., prevent palm dimpling), a rigid outer hood structure yields increased acceleration and damage to objects that impact the hood assembly. The approach also addresses the deficiencies in relying on complex release mechanisms to offset the acceleration of an impacting object by instead relying on the offset of the deformable reinforcement structure to prevent an impacting object from contacting a rigid fascia feature without incorporating complex components into the hood assembly.

In some embodiments, the main reinforcement of the reinforcement structure comprises a plurality of attachment tabs. Each of the plurality of attachment tabs is fixedly attached a portion of the inner hood structure. In some embodiments, the plurality of attachment tabs comprises a first subset of the plurality of attachment tabs extend towards a rear of the inner hood structure and a second subset of the plurality of attachment tabs extend towards a front of the inner hood structure. The first subset of the plurality of attachment tabs may be evenly spaced between a first rigid front fascia feature (e.g., a driver side headlight) and a second rigid front fascia feature (e.g., a passenger side headlight). The second subset of the plurality of attachment tabs may comprise a primary attachment tab aligned with the center of the inner hood structure and a pair of secondary attachment tabs positioned proximate to a pair of lateral edges of the main reinforcement.

In some embodiments, the rib structure is structured such that a bottom surface of the rib structure forms a clearance between a bottom surface of the rib structure and the rigid front fascia feature. For example, the clearance may be determine based on a relationship of the threshold HIC values, the stiffness of the materials selected and the amount of clearance between the outer hood structure, the inner hood structure, and the rigid fascia feature. In some embodiments the thickness of the rib structure is determined based on threshold deformation criteria. For example, the amount of material utilized to form the height of the ridge as well as the profile of the ridge based on a thickness of the material forming the profile may be based on the stiffness of the selected material and the amount of material required to reduce or alter an impacting objects acceleration such that a peak HIC value is below a threshold maximum.

In some embodiments, the rear flange is fixedly attached to a portion of the inner hood structure proximate to the rigid front fascia feature. A central attachment point of the rear flange may be aligned with a center of the rigid from fascia feature.

In some embodiments, the reinforcement extension further comprises a support leg extending from the rib structure towards the front of the inner hood structure and a support tab positioned to comprise a laterally outer edge of the vehicle hood reinforcement structure, wherein the support tab extends towards the rear of the inner hood structure from the rib structure and is continuous with the rear flange.

In some embodiments, the vehicle hood reinforcement structure comprises a pair of reinforcement extensions extending from a pair of laterally outboard edges of the main body. For example, the main body of the vehicle hood reinforcement structure may be positioned between a pair of rigid fascia features accommodated by the inner hood structure. Each of the reinforcement extensions may accommodate each of the pair of rigid fascia features such that there is a first clearance between the top of each of the pair of rigid fascia features and the bottom surface of each of the reinforcement extensions and a second clearance between the top surface of each reinforcement extension and the bottom surface of the inner hood structure.

In some embodiments, the vehicle hood reinforcement structure is incorporated into a front portion of a hood assembly comprising an outer hood structure, an inner hood structure, and the vehicle hood reinforcement structure. The outer hood structure may comprise a continuous metal sheet shaped to cover an opening in a front portion of vehicle body. At least a front section of the outer hood structure may be fixedly attached to a front section the inner hood structure. In some embodiments, the inner hood structure comprises a plurality of rib structures formed at least in part by cutouts strategically positioned to reduce stiffness of the inner hood structure. The vehicle hood reinforcement structure may be fixedly attached to a front section of the inner hood structure corresponding to an area between a first rigid front fascia feature and a second rigid front fascia feature.

In some embodiments, the vehicle hood reinforcement structure is incorporated into a vehicle comprising a front bay and a hood assembly structured to accommodate a rigid front fascia feature and positioned to cover the front bay. The hood assembly may comprise an outer hood structure, an inner hood structure and the vehicle hood reinforcement structure.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Figure 1:
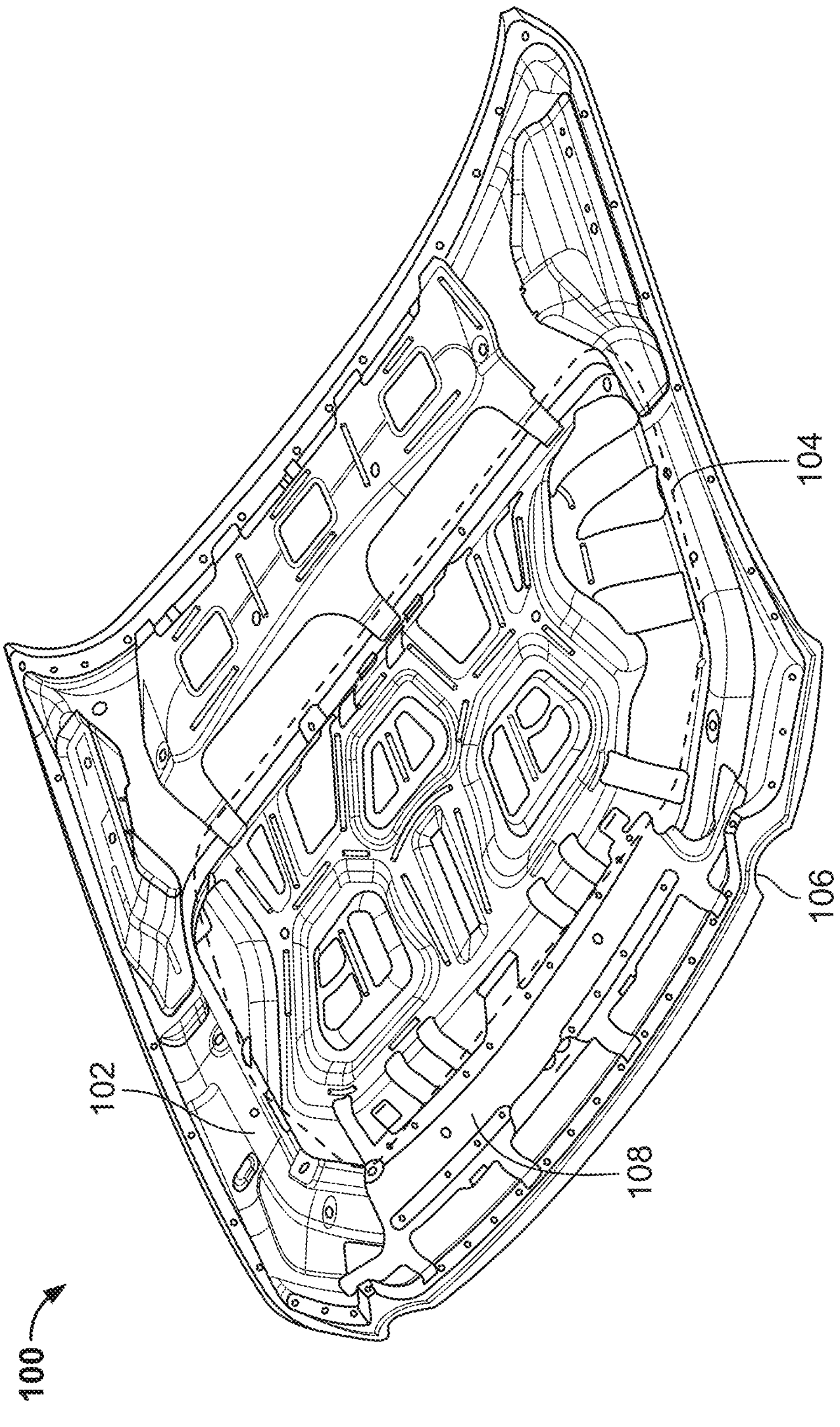
FIG. 1 illustrates an example of a partial hood assembly comprising an inner hood structure with a reinforcement structure, in accordance with some embodiments of the disclosure.

The above and other objects and advantages of the disclosure may be apparent upon consideration of the following detailed description, taken in conjunction with the accompanying drawings, in which:

FIG. 1 depicts partial hood assembly 100 comprising an inner hood structure with a reinforcement structure. Partial hood assembly 100 comprises inner hood structure 102, having a ribbed portion 104 and a rigid fascia feature 106, and reinforcement main body 108. Inner hood structure 102 may be positioned over a vehicle bay (e.g., a front portion of a vehicle body with an opening where either an engine assembly may be installed or where a storage space is located). The bottom surface of inner hood structure 102 may be shaped to create a clearance between a top portion of the contents within the vehicle bay and the bottom surface of inner hood structure 102 (e.g., 50-150 mm). In some embodiments, inner hood structure 102 may be covered by an outer hood structure that is fixedly attached to a front portion of inner hood structure 102 that is proximate to reinforcement main body 108.

The center of inner hood structure 102 comprises ribbed portion 104. Ribbed portion 104 comprises a plurality of cutouts which form rib structures in the main body of inner hood structure 102. The cutouts are strategically positioned to reduce the stiffness of inner hood structure 102 in the event that an object impacts partial hood assembly 100. Inner hood structure 102 may be required to satisfy safety requirements and/or regulations regarding deformation criteria and deceleration of the impacting object (e.g., requirements such as UN ECE R127-GTR9). Ribbed portion 104 may not extend to an outer edge of inner hood structure 102 to avoid a reduction in the stiffness of the outer frame of inner hood structure 102. For example, if a partial hood assembly is installed in a vehicle assembly over a front vehicle bay and must be gripped to open and close, the outer edge of inner hood structure 102 must be of sufficient stiffness to enable use without deformation or dimpling. Accordingly, ribbed portion 104 may not extend to any edge of inner hood structure 102.

The edge of inner hood structure 102 comprises rigid fascia feature 106. Rigid fascia feature 106 is structured to accommodate a portion of a fascia to which partial hood assembly 100 may be secured by a latching mechanism when partial hood assembly is in a closed position over a vehicle bay. The fascia may comprise a plurality of rigid features that have a stiffness sufficient to cause damage to objects that impact the rigid features. For example, the fascia may be a front vehicle fascia which comprises a pair of headlights that comprise a profile that extends above a plane corresponding to where inner hood structure 102 sits in a closed position over the vehicle bay partial hood assembly 100 covers. The pair of headlights may require a protective barrier to prevent an object that impacts the top of the pair of headlights from shattering the headlights. In addition, requirements such as UN ECE R127-GTR9 may require aspects of partial hood assembly 100 to prevent an impacting object from contacting the rigid portions encompassing the rigid features (e.g., the headlights and/or the protective features encompassing the headlights). Accordingly, inner hood structure 102 accommodates the rigid features at least with rigid fascia feature 106.

Affixed to inner hood structure 102 is reinforcement main body 108. Reinforcement main body 108 is structured to complement inner hood structure 102 and accommodate the structural requirements previously described. For example, inner hood structure 102 may have a reduced stiffness as a result of ribbed portion 104 in order to accommodate requirements such as UN ECE R127-GTR9. Reinforcement main body 108 is positioned between a front edge of inner hood structure 102 and a front portion of ribbed portion 104 to increase stiffness of the front portion of inner hood structure 102 so as to prevent issues such as palm dimpling when gripping partial hood assembly 100. Additionally, reinforcement main body 108 may comprise plurality of attachment tabs to secure main reinforcement 108 to inner hood structure 102. Main reinforcement 108 may further comprise a plurality of additional features and extensions to create an offset between main reinforcement 108 and the surface of inner hood structure 102. The offset may be determined based on criteria extracted from requirements (e.g., UN ECE R127-GTR9) such that should an object impact an outer hood structure, that is positioned over inner hood structure 102, main reinforcement 108 absorbs and/or redirects the acceleration of the impacting object such that the impacting object does not compress the various components or features of partial hood assembly 100 to a point where a bottom surface of rigid fascia feature 106 contacts the fascia feature accommodated by rigid fascia feature 106 (e.g., partial hood assembly 100 is configured to deform and compress any or all components to prevent a direct impact between an impacting object and a headlight).

Figure 2:
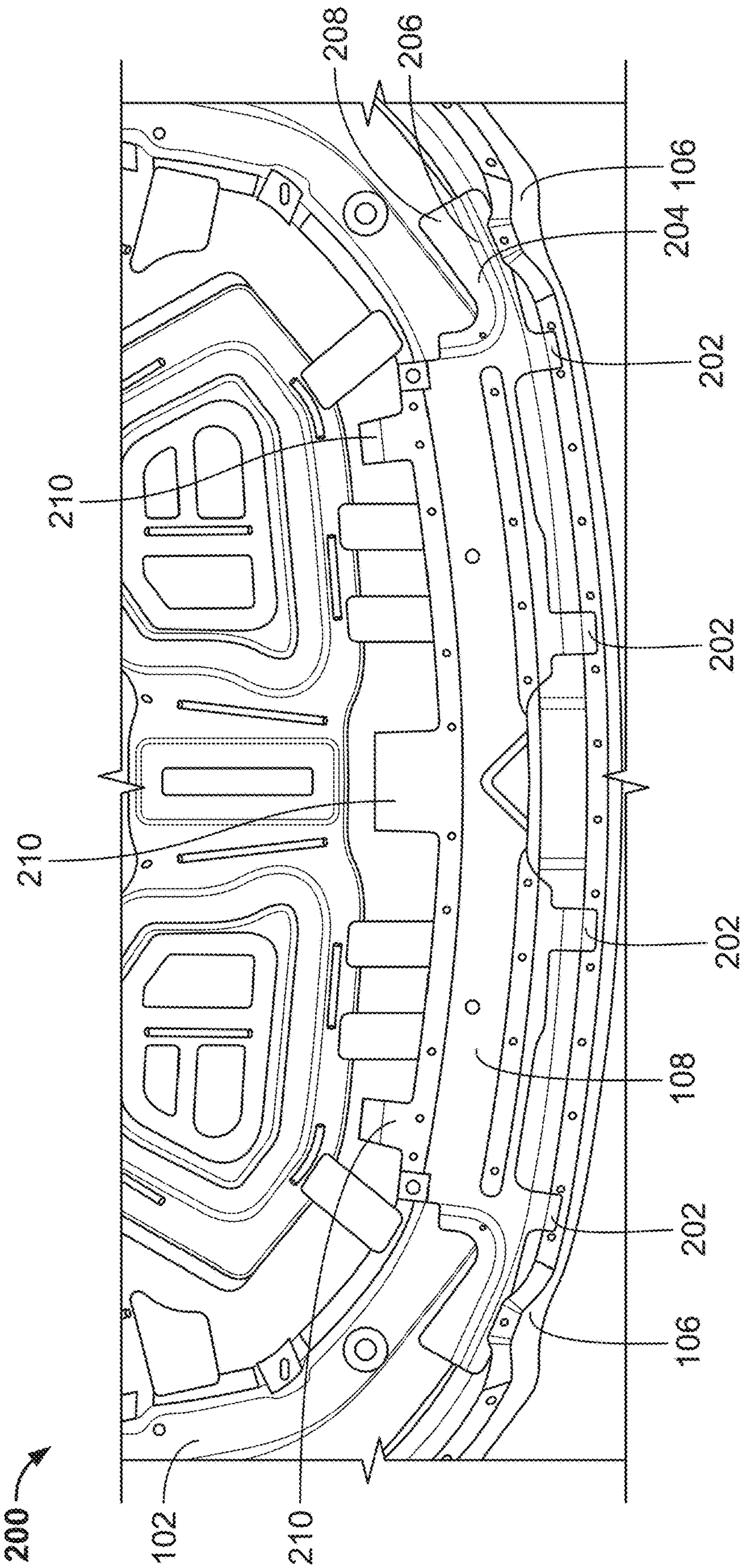
FIG. 2 illustrates an example of a reinforcement structure fixedly attached to a front portion of an inner hood structure, in accordance with some embodiments of the disclosure.

FIG. 2 depicts reinforcement structure 200 fixedly attached to a front portion of inner hood structure 102. Reinforcement structure 200 comprises main reinforcement 108 as shown in FIG. 1 and may be incorporated into partial hood assembly 100 of FIG. 1. Additionally, the various elements of FIG. 1 may be incorporated into an assembly comprising reinforcement structure 200 and the various elements of reinforcement structure 200 may also be incorporated, as a whole or in part, into partial hood assembly 100 of FIG. 1.

Reinforcement structure 200 comprises attachment tabs 202, attachment tabs 210, reinforcement extension 204, rib structure 206, and rear flange 208. Attachment tabs 202 extend towards a front edge of inner hood structure 102 and are fixedly attached to the surface of inner hood structure 102. For example, each of attachment tabs 202 may be welded to the surface of inner hood structure 102 or may be secured by fasteners and/or an adhesive. Attachment tabs 202 are spaced between and symmetrical about between rigid fascia features 106. Rigid fascia features 106 of inner hood structure correspond to rigid fascia feature 106 as described in FIG. 1. In some embodiments, more or less than the depicted number of attachment tabs 202 may be utilized depending on the structure and stiffness of inner hood structure 102 so as to both prevent palm dimpling while also preventing an impacting object from contacting rigid fasci features 106.

Attachment tabs 210 extend towards the rear of inner hood structure 102 and are fixedly attached to the surface of inner hood structure 102. For example, each of attachment tabs 210 may be welded to the surface of inner hood structure 102 or may be secured by fasteners and/or an adhesive. Attachment tabs 210 are space between and symmetrical about rigid fascia features 106. Rigid fascia features 106 of inner hood structure correspond to rigid fascia feature 106 as described in FIG. 1. In some embodiments, more or less than the depicted number of attachment tabs 210 may be utilized depending on the structure and stiffness of inner hood structure 102 so as to both prevent palm dimpling while also preventing an impacting object from contacting a fascia feature such as a headlight accommodated by rigid fascia features 106. In some embodiments, attachment tabs 210 comprise a primary attachment tab aligned with the center of inner hood structure 102 and a pair of secondary attachment tabs positioned proximate to a pair of lateral edges of main reinforcement 108.

Proximate to a laterally outboard one of attachment tabs 202 is reinforcement extension 204. Reinforcement extension 204 is structure to accommodate rigid fascia feature 106. For example, reinforcement extension 204 may be positioned such that there is a space between the bottom of reinforcement extension 204 and a top surface of rigid fascia feature 106 such that if an object impacts an outer hood structure positioned over inner hood structure 102, reinforcement extension 204 receives the impacting object and deforms/redirects the acceleration to prevent the impacting object from making contact with a fascia feature such as a headlight accommodated by rigid fascia feature 106. Reinforcement extension 204 comprises rib structure 206, which extends from main reinforcement 108 towards a side of inner hood structure 102. Rib structure 206 is structured to be stiff enough to prevent deformation of reinforcement extension 204 such that when an object impacts a portion of a hood assembly above reinforcement extension 204, reinforcement extension 204 does not deform such that reinforcement extension 204 contacts with a fascia feature such as a headlight accommodated by rigid fascia feature 106. The geometry of rib structure 206 may be defined by the shape of rigid fascia feature 106 as well as the criteria for allowable acceleration of an impacting object as found in various requirements (e.g., UN ECE R127-GTR9).

Extending rearwards of rib structure 206 is rear flange 208. Rear flange 208 extends rearward from the structure of rib structure 206 as continuous part of extension 204 and at least partially covers rigid fascia feature 106. For example, rigid fascia feature 106 may be structure to accommodate a headlight or a headlight assembly, which may comprise a light bulb. Rear flange 208 may extend towards the rear of inner hood structure 102 such that the material comprising rear flange 208 covers at least a mounting portion of a headlight. In some embodiments, rear flange 208 is fixedly attached to a portion of the surface of inner hood structure 102 corresponding to a rear portion of rigid fascia feature 106. For example, rear flange 208 may be welded to the surface of inner hood structure 102. Alternatively, rear flange 208 may be fixedly attached by fasteners and/or an adhesive. In some embodiments, reinforcement structure 200 comprises a plurality of reinforcement extensions (e.g., more than one of reinforcement extension 204), each of which is arranged proximate to a respective rigid fascia feature (e.g., rigid fascia feature 106) as shown in FIG. 2.

Figure 3:
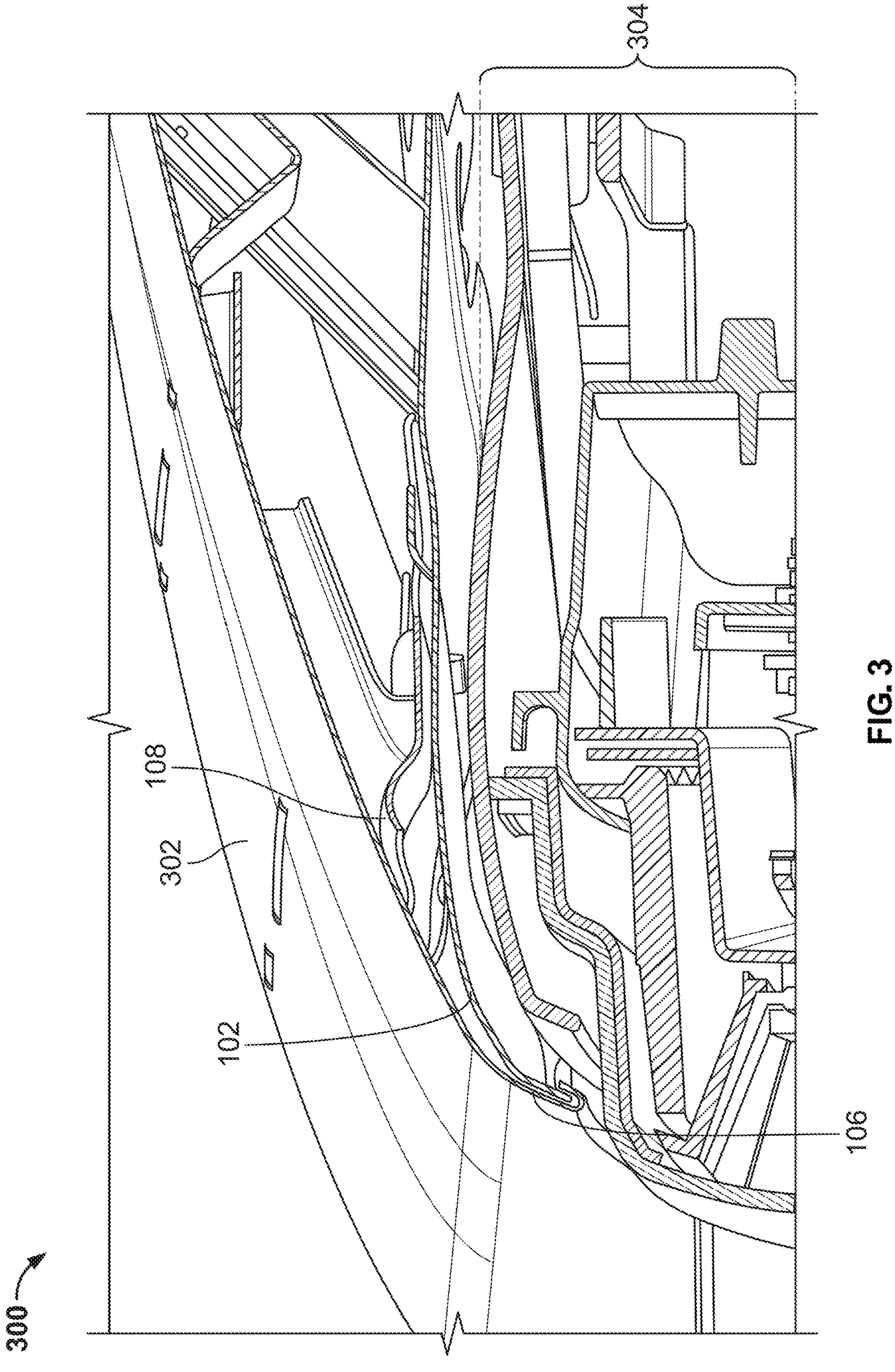
FIG. 3 illustrates a cross section of a front hood assembly proximate to a rigid vehicle frame feature, in accordance with some embodiments of the disclosure.

FIG. 3 depicts an exemplary cross section of front hood assembly 300, which comprises a hood structure proximate to a rigid vehicle frame feature, in accordance with some embodiments of the disclosure. Front hood assembly 300 may comprise partial hood assembly 100 of FIG. 1, reinforcement structure 200 of FIG. 2, and/or combinations of the various elements thereof.

Front hood assembly 300 comprises outer hood structure 302, inner hood structure 102 of FIG. 1, reinforcement 108 of FIG. 1, and rigid fascia feature assembly 304. In some embodiments, outer hood structure 302 comprises a continuous metal sheet. The front edge of outer hood structure 302 is fixedly attached to a front edge of inner hood structure 102. In some embodiments, outer hood structure 302 may be welded to inner hood structure 102 or secured to inner hood structure 102 utilizing fasteners and/or an adhesive. There is an offset between the bottom surface of outer hood structure 302 and the top surface of inner hood structure 102. The offset may be determined based on requirements, such as those found in UN ECE R127-GTR9, and considering at least in part the stiffness and/or thickness of the material utilized to form outer hood structure 302.

Positioned between outer hood structure 302 and inner hood structure 102 is reinforcement 108. Reinforcement 108 may incorporate any or all of the reinforcement features as shown in FIGS. 1 and 2. Reinforcement 108 is fixedly attached to inner hood structure 102. Inner hood structure 102 comprises rigid fascia feature 106. Rigid fascia feature 106 provides an accommodation in the profile of inner hood structure 102 to create space for features that extend upwards or protrude as a part of rigid fascia feature assembly 304. In some embodiments, the components and features of rigid fascia feature assembly 304 comprise a headlight assembly. Rigid fascia feature assembly 304 may comprise components or features corresponding to any aspect of a front vehicle fascia assembly. The top of rigid fascia feature assembly 304 does not make contact with inner hood structure 102. Rigid fascia feature 106 comprises a profile (e.g., a concave or recessed profile) to accommodate the profile of the top of rigid fascia feature assembly 304.

In some embodiments, front hood assembly 300 is assembled by a series of steps described herein. For example, inner hood structure 102 is provided for mounting other components and structures described herein. Additionally, outer hood structure 302 is provided for securing a front lip of outer hood structure 302 to a front lip of inner hood structure 102. Outer hood structure 302 is fixedly attached at the front lip to inner hood structure 102. The two structures may be fixedly attached by welding, rivets, or any form of fastener suitable for the thickness of each of outer hood structure 302 and inner hood structure 102. Reinforcement 108 is also provided and positioned proximate to a front edge of inner hood structure 102 (e.g., the front edge of reinforcement 108 is positioned within 300 mm of the front edge of inner hood structure 102 and does not overlap with the securing features that fixedly attached outer hood structure 302 to inner hood structure 102). Reinforcement 108 comprises features to accommodate rigid facia features such as rigid fascia feature 106 and reinforcement 108 is positioned on inner hood structure 102 such that the features structured to accommodate rigid fascia feature 106 are positioned vertically proximate to rigid fascia feature 106. Reinforcement 108 is also fixedly attached to inner hood structure 102 by weld points, rivets, or any form of fastener suitable for the thickness of reinforcement 108 and inner hood structure 102. In some embodiments, where fasteners are used the fasteners are positioned and arranged such that they do not penetrate or indent outer hood structure 302.

Figure 4:
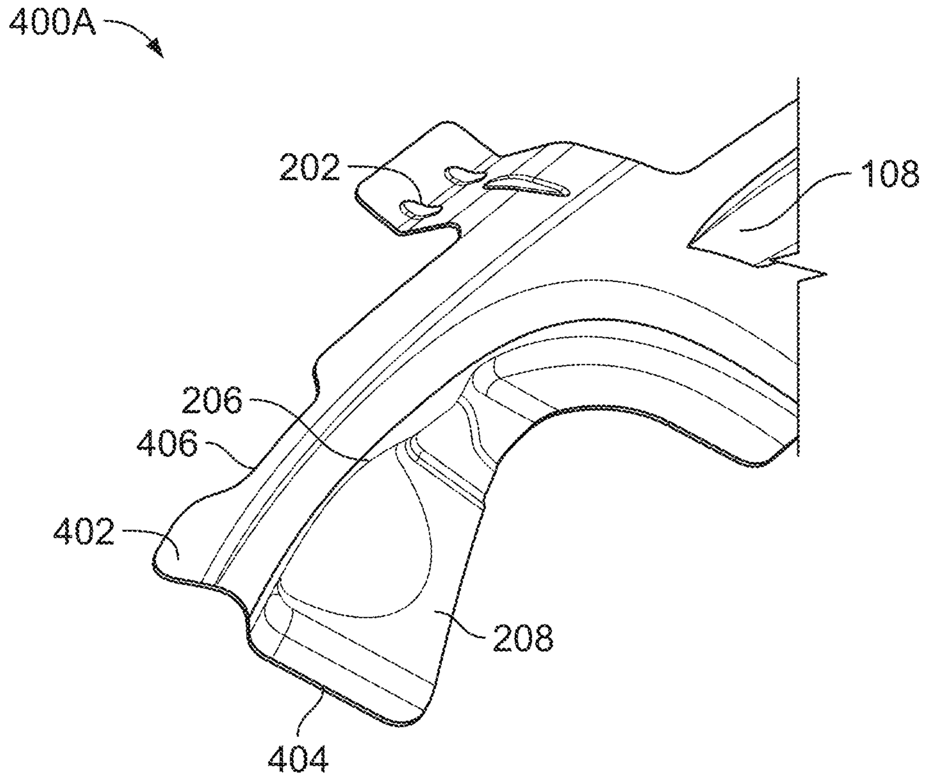
FIG. 4 illustrates an example pair of reinforcement extensions of reinforcement structures structured to accommodate a rigid fascia feature, in accordance with some embodiments of the disclosure.
Figure 4:
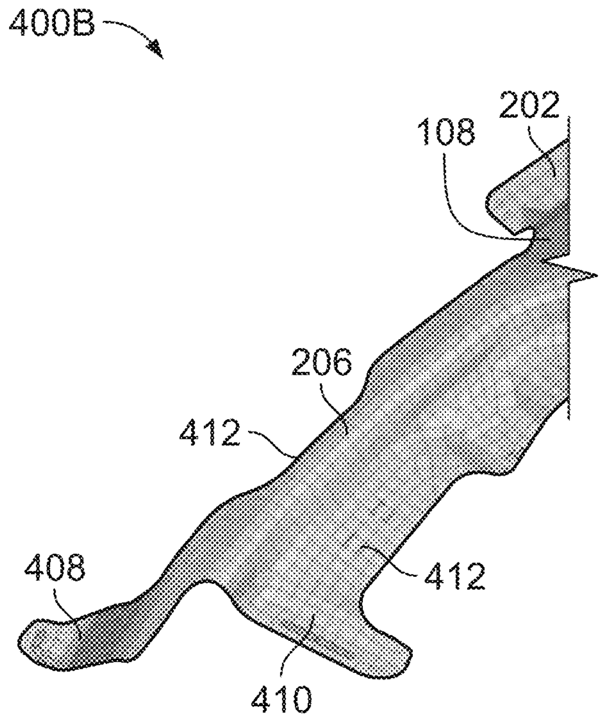

FIG. 4 depicts reinforcement extensions 400A and 400B which are elements of reinforcement structures structured to accommodate a rigid fascia feature, in accordance with some embodiments of the disclosure. Either of or a combination of reinforcement extensions 400A and 400B may be incorporated into main reinforcement 108 as shown in FIGS. 1-3. For example, either reinforcement extension 400A or 400B and/or a combination thereof may be incorporated into reinforcement structure 200 of FIG. 2 as part of or in place of reinforcement extension 204 of FIG. 2.

Reinforcement extension 400A comprises attachment tab 202 which may be fixedly attached proximate to a front edge of an inner hood structure (e.g., inner hood structure 102 of FIG. 1). Reinforcement extension 400A extends from main reinforcement 108 and further comprises rib structure 206 from FIG. 2. Extending forward from rib structure 206 is cutout 406. Cutout 406 is structured to accommodate a feature of an inner hood structure to which a reinforcement assembly comprising reinforcement extension 400A is fixedly attached. For example, inner hood structure 102 comprises rigid fascia feature 106, as shown in FIG. 1. Reinforcement extension 400A may be positioned such that reinforcement extension 400A extends over rigid fascia feature 106 and a center line of cutout 406 aligns with a centerline of rigid fascia feature 106. Cutout 406 is structured such that the profile of rib structure 206 forms a semi-circle and continues to extend rearward into a tab, for increased stiffness in rib structure 206 that would otherwise be lower without this feature. The tab can accommodate the rigid feature such that a protrusion or bulge is not present as a result of a connection between the tab and surface it is secured to.

Reinforcement extension 400A also comprises support tab 402, which extends forward from a center of rib structure 206. Support tab 402 comprises a rounded quadrilateral that does not extend to make contact with a surface below support tab 402. For example, reinforcement extension 400A may be positioned over rigid fascia feature 106 of FIG. 1. In this example, support tab 402 is structured to have an offset between its bottom surface and a top surface of rigid fascia feature 106. Reinforcement extension 400A further comprises lateral edge 404. In some embodiments, lateral edge 404 is fixedly attached to a top surface of an inner hood structure (e.g., a surface of inner hood structure 102 of FIG. 1 proximate to or including the surface of rigid fascia feature 106). Lateral edge 404 may be fixedly attached to increase stiffness of reinforcement extension 400A to meet requirements (e.g., UN ECE R127-GTR9). Lateral edge 404 is laterally outboard of rear flange 208 of FIG. 2 and is formed out of material continuous with rear flange 208.

Reinforcement extension 400B comprises attachment tab 202 which may be fixedly attached proximate to a front edge of an inner hood structure (e.g., inner hood structure 102 of FIG. 1). Reinforcement extension 400B extends from main reinforcement 108 and further comprises rib structure 206 from FIG. 2. Extending forward from rib structure 206 is cutout 412. Cutout 412 is structured to accommodate a feature of an inner hood structure to which a reinforcement assembly comprising reinforcement extension 400B is fixedly attached. For example, inner hood structure 102 comprises rigid fascia feature 106, as shown in FIG. 1. Reinforcement extension 400B may be positioned such that reinforcement extension 400B extends over rigid fascia feature 106 and a center line of cutout 412 aligns with a centerline of rigid fascia feature 106. Cutout 412 is structured such that the profile of rib structure 206 forms an arch to reduce stiffness in rib structure 206 in order to satisfy deformation criteria.

Reinforcement extension 400B also comprises support leg 408, which extends forward from rib structure 206. Support leg 408 comprises an extension from rib structure 206 that contacts with a surface below support leg 408. For example, reinforcement extension 400B may be positioned over rigid fascia feature 106 of FIG. 1. In this example, support leg 408 is structured to be fixedly attached (e.g., by welding, an adhesive, a fastener, and/or any combination thereof) to a surface corresponding to or proximate to rigid fascia feature 106. The structure of support leg 408 is determined based on deformation and stiffness criteria to enable reinforcement extension 400B to satisfy impact requirements (e.g., UN ECE R127-GTR9). Reinforcement extension 400B further comprises support tab 410. In some embodiments, support tab 410 is fixedly attached to a top surface of an inner hood structure (e.g., a surface of inner hood structure 102 of FIG. 1 proximate to or including the surface of rigid fascia feature 106). Support tab 410 may be fixedly attached to increase stiffness of reinforcement extension 400B to meet requirements (e.g., UN ECE R127-GTR9). Support tab 410 is laterally outboard of rear flange 412 and is formed out of material continuous with rear flange 412. Support tab 410 extends rearward of rib structure 206 to a length beyond the profile of rear flange 412 to improve rotational stiffness about the lateral center axis of rib structure 206. In some embodiments, support tab 410 is positioned to comprise a laterally outer edge reinforcement extension 400B, extending towards the rear of an inner hood structure from rib structure 206 and is continuous with rear flange 412.

Figure 5:
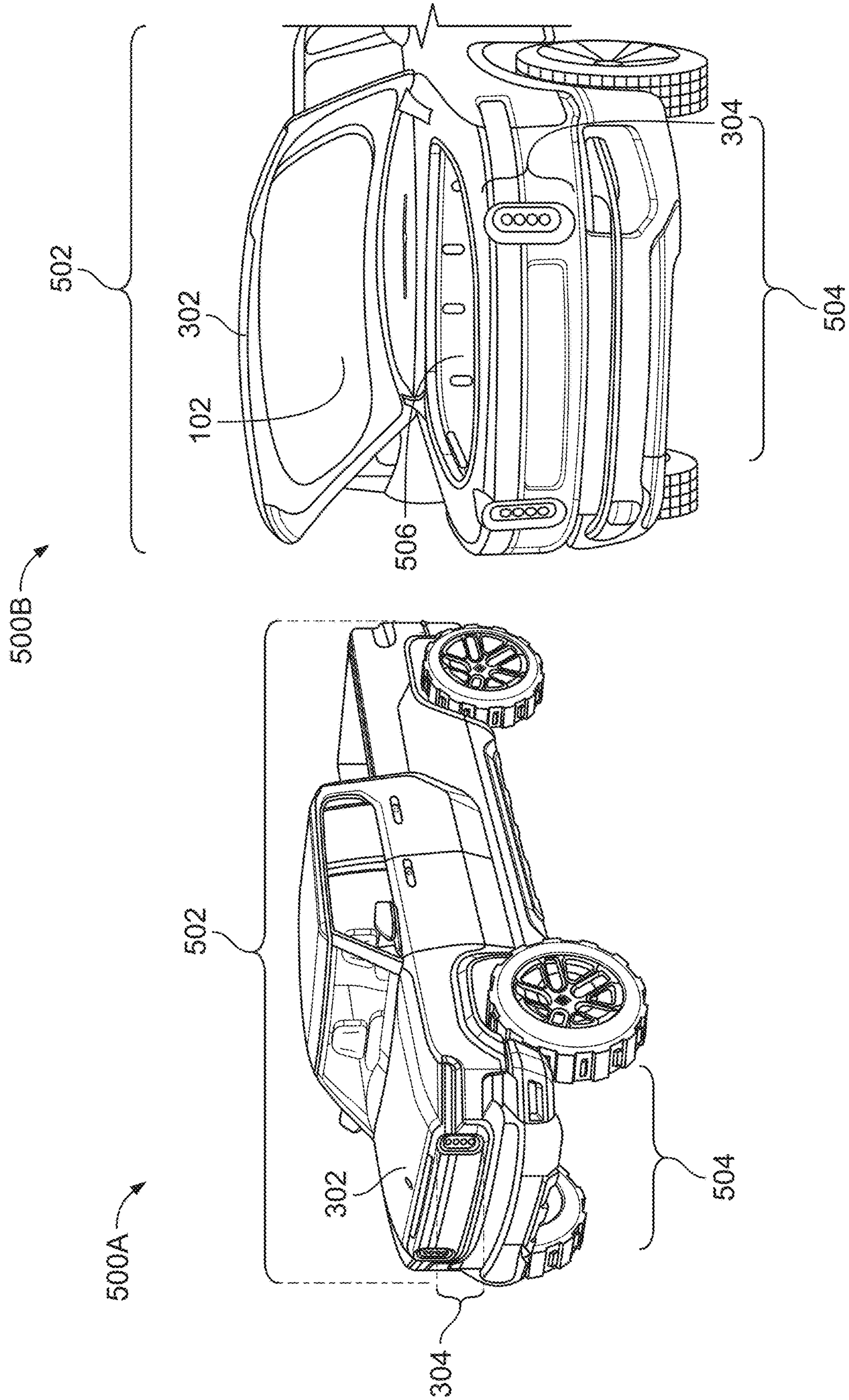
FIG. 5 illustrates a pair of views of a vehicle body comprising a hood assembly configured to cover a bay comprising a rigid vehicle frame feature, in accordance with some embodiments of the disclosure.

FIG. 5 depicts views 500A and 500B of vehicle body 502 comprising a hood assembly configured to cover a bay comprising a rigid vehicle frame feature, in accordance with some embodiments of the disclosure. Vehicle body 500 may incorporate in whole or in part any feature or element of partial hood assembly 100 of FIG. 1, reinforcement structure 200 of FIG. 1, front hood assembly 300 of FIG. 3, and/or reinforcement extensions 400A and 400B of FIG. 4

View 500A comprises vehicle body 502. Vehicle body 502 comprises outer hood structure 302 of FIG. 3, rigid front fascia feature assembly 304 of FIG. 3, and front fascia 504. Front fascia 504 comprises a pair of headlights which are comprised of rigid front fascia assembly 304. Outer hood structure 302 is depicted in a closed position over a vehicle bay in vehicle body 502. Below outer hood structure 302 are an inner hood structure and a reinforcement structure configured to accommodate a feature from rigid front fascia assembly 304 that extends above a plane defined by the closed position of outer hood structure 302.

View 500B comprises vehicle body 502. Vehicle body 502 comprises outer hood structure 302 of FIG. 3, rigid front fascia feature assembly 304 of FIG. 3, and front fascia 504. Front fascia 504 comprises a pair of headlights which are comprised of rigid front fascia assembly 304. Outer hood structure 302 is depicted in an open position over vehicle bay 506 in vehicle body 502. Bay 506 may be utilized as a storage space in vehicle body 502 or may house portions of a powertrain or other components to assist in the movement or function of a vehicle corresponding to vehicle body 502. Fixedly attached to a bottom surface of outer hood structure 302 are inner hood structure 102 of FIG. 1 and a reinforcement structure configured to accommodate rigid front fascia feature 106. Rigid front fascia feature 106 corresponds to a shape in inner hood structure 102 and in some embodiments outer hood structure 302 that allows a feature from rigid front fascia assembly 304 to extend above a plane defined by the closed position of outer hood structure 302 (e.g., as shown in view 500A). The reinforcement structure is positioned between outer hood structure 302 and inner hood structure 102.

Figure 6:
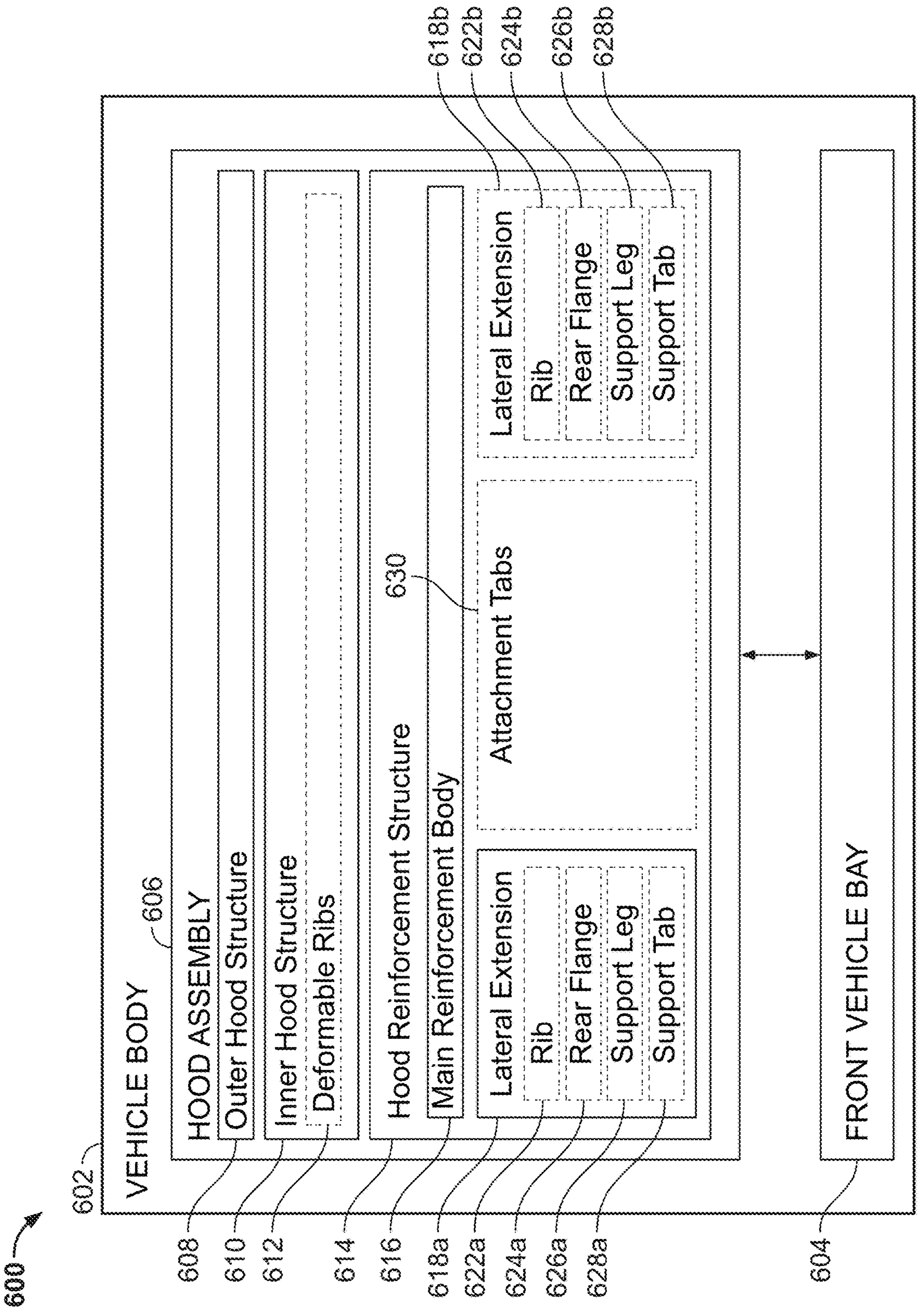
FIG. 6 illustrates a block diagram of a vehicle body comprising a vehicle hood assembly, in accordance with some embodiments of the disclosure.

FIG. 6 depicts a block diagram of vehicle body 600 comprising a vehicle hood assembly, in accordance with some embodiments of the disclosure. Vehicle body may incorporate in whole or in part any feature or element of partial hood assembly 100 of FIG. 1, reinforcement structure 200 of FIG. 1, front hood assembly 300 of FIG. 3, reinforcement extensions 400A and 400B of FIG. 4, and/or vehicle body 502 of FIG. 5.

Vehicle body 600 comprises hood assembly 606 and front vehicle bay 604. Front vehicle bay 604 may correspond to vehicle bay 506 of FIG. 5. Hood assembly 606 comprises outer hood structure 608, inner hood structure 610, and hood reinforcement structure 614. Outer hood structure 608 may comprise outer hood structure 302, as shown in FIGS. 3-5. In some embodiments, inner hood structure 610 comprises deformable rib structures 612. Deformable rib structures 612 may correspond to ribbed portion 104 of FIG. 1.

Hood reinforcement structure 614 comprises main reinforcement 616 and reinforcement extension 618*a*. In some embodiments, main reinforcement 616 corresponds to main reinforcement 108 of FIG. 1. In some embodiments, reinforcement extension 618*a* may comprise any one of or a combination of reinforcement extension 204 of FIG. 2 and/or reinforcement extensions 400A and 400B of FIG. 4. In some embodiments, hood reinforcement structure 614 further comprises reinforcement extension 618*b* which also may comprise any one of or a combination of reinforcement extension 204 of FIG. 2 and/or reinforcement extensions 400A and 400B of FIG. 4. In some embodiments, lateral reinforcement structure may comprise a plurality of either or both of reinforcement extensions 618*a* and 618*b*.

In some embodiments, reinforcement extensions 618*a* and 618*b* further comprise rib structure 622*a* and 622*b*, rear flanges 624*a* and 624*b*, support legs 626*a* and 626*b*, and support tabs 628*a* and 628*b*, respectively. Rib structure 622*a* may correspond to rib structure 206 of FIG. 2. Rear flanges 624*a* and 624*b* may correspond to rear flange 208 of FIG. 2 and/or rear flange 412. Support legs 626*a* and 626*b* may correspond to support leg 406 of FIG. 4. Support tabs 628 *a* and 628*b* may correspond to support tab 410 of FIG. 4. In some embodiments, attachment tabs 630 extend from main reinforcement 616 and may be positioned between reinforcement extensions 618*a* and 618*b* to secure hood reinforcement structure 614 to inner hood structure 610. Attachment tabs 630 may correspond to attachment tabs 202 and/or attachment tabs 201 of FIG. 2.

Figure 7:
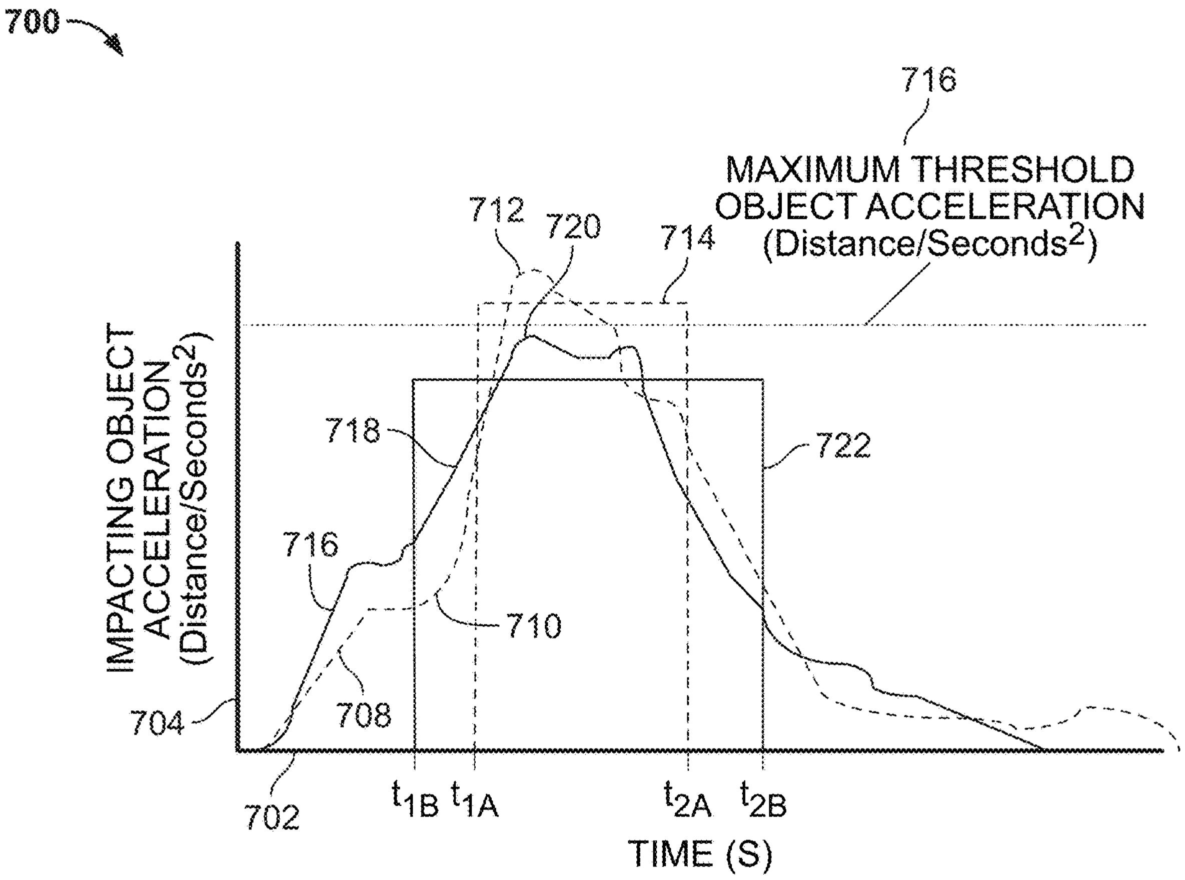
FIG. 7 illustrates example charts plotting the performance of a pair reinforcement structures relative to HIC values, in accordance with some embodiments of the disclosure.

FIG. 7 illustrates example chart 700 which indicates the performance of a pair reinforcement structures relative to HIC values, in accordance with some embodiments of the disclosure. Chart 700 depicts both an example reinforcement structure performance that violates the criteria of UN ECE R127-GTR9 and an example reinforcement structure performance that satisfies the criteria of UN ECE R127-GTR9. The reinforcement structure corresponding to the performance that violates the criteria does not incorporate any features corresponding to reinforcement extension 204 of FIG. 2 and lacks features of reinforcement extensions 400A and 400B of FIG. 4. The reinforcement structure corresponding to the performance that satisfies the criteria incorporates some or all of the features corresponding to reinforcement extension 204 of FIG. 2 and/or in combination with any or all features of reinforcement extensions 400A and 400B of FIG. 4.

Chart 700 comprises axis 702 corresponding to time passed in seconds during data collection and axis 704 corresponding to the measured acceleration of an object, in units of distance per seconds squared, that impacts a hood assembly (e.g., a hood assembly incorporating any or all of the elements depicted in the various structures and assemblies of FIGS. 1-6). Threshold 706 corresponds to a maximum threshold object acceleration as defined by the HIC criteria utilized to design structures corresponding to the various structures and assemblies of FIGS. 1-6. For example, the maximum acceleration of the object impacting a representative hood assembly may be determined based on the HIC calculation.

An example of an HIC formula is defined in the requirements of UN ECE R127-GTR9. The HIC may comprise the calculated result of accelerated time histories (e.g., may correlate to an area under an acceleration curve plotted over time as depicted in chart 700). The example HIC formula as published is the requirements of UN ECE R127-GTR9 is as follows:

$$HIC = \left[ \frac{1}{t_2 - t_1} \int_{t_1}^{t_2} a\,dt \right]^{2.5} (t_2 - t_1)$$

In the shown formula, the variable "a" corresponds to the resultant acceleration measured in unites of gravity "g" (1 g=9.81 m/s') of an object impacting a hood assembly. The variables "$t_1$" and "$t_2$" correspond to two time instants (in units of seconds) during the impact of the object with the hood assembly, defining an interval between the beginning and the end of the reporting period for which the HIC is a maximum, where $t_2-t_1$ is at most 15 ms, which can be utilized to quantify threshold 706 (e.g., as shown in chart 700 along of axis 702). The shown formula may be utilized to determine an area under an acceleration curve for an object impacting a hood assembly. Based on the area under the curve, deformation characteristics of the various structures defined herein may be determined and may be modified in order to adjust the area under the acceleration curve (e.g., adjusting positioning and/or thickness of the various structures described herein to reduce the area under the acceleration curve).

Curve 708 indicates the acceleration over time of an object impacting a hood assembly that does not incorporate any features corresponding to reinforcement extension 204 of FIG. 2 and lacks features of reinforcement extensions 400A and 400B of FIG. 4. Plot portion 710 corresponds to a portion of curve 718 the impacting object continues to accelerate at a magnitude initially lower than the object would as compared to curve 716 a plot portion 718, which incorporates the aforementioned reinforcement extension features in some capacity, and then rapidly increases a rate of acceleration likely deforming at least a first portion of the hood assembly (e.g., an outer hood structure). Plot portion 712 corresponds a portion of curve 708 the acceleration reaches a peak value and starts to be reduced, likely corresponding to the hood deformation halting and the energy of the impacting object being absorbed by the structure of the impacting object itself. As depicted in chart 700, plot portion 712 exceeds threshold 706 and the area under curve 708 exceeds an acceptable HIC value, as determined by the previously presented example formula, and as demonstrated by area function 714. Area function 714 corresponds to an approximate representation of the area under curve 708, as bound by time stamps $t_{1A}$ and $t_{2A}$, to represent how the HIC criteria, once calculated, can be visualized for the purposes of a performance comparison between assemblies.

Curve 716 of chart 700 indicates the acceleration over time of an object impacting a hood assembly that incorporates features corresponding to reinforcement extension 204 of FIG. 2 and/or features of reinforcement extensions 400A and/or 400B of FIG. 4. Plot portion 718 corresponds to a portion of curve 716 the impacting object accelerates at a magnitude initially higher than as shown in plot portion 710 of curve 708, likely deforming a portion of the hood assembly, and then accelerates at a rate less than in plot portion 710 of curve 708. Considering the inclusion of the reinforcement extension, the reinforcement extension may redirect the energy of the impacting object such that the acceleration, while at a higher initial magnitude perhaps corresponding to plastic deformation, increases at a reduced rate without allowing the impacting object to reach an elevated peak acceleration value.

Plot portion 720 corresponds to a curve where the acceleration reaches a peak value and starts to be reduced, likely corresponding to the final aspects of hood deformation halting as a result of the presence of the reinforcement extension and the energy of the impacting object being redirected such that the impacting object itself does not structurally absorb the energy (e.g., the reinforcement extension either elastically or plastically deforms to change at least in part the trajectory of the impacting object's momentum in combination with the outer hood structure and inner hood structure). Plot portion 720 does not exceed threshold 706 and the area under curve 716 as bound by time stamps $t_{1B}$ and $t_{2B}$ does not exceed an acceptable HIC value, as determined by the previously presented example formula. Area function 722 corresponds to an approximate representation of the area under curve 716, as bound by time stamps $t_{1B}$ and $t_{2B}$, to represent how the HIC criteria, once calculated, can be visualized for the purposes of a performance comparison between assemblies.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A hood reinforcement structure comprising:

a main reinforcement configured to be arranged between outer and inner hood structures; and a reinforcement extension that extends laterally away from the main reinforcement and comprises a rear flange configured to extend rearward over a rigid front fascia, wherein a central attachment point of the rear flange is aligned with a center of the rigid front fascia.

2. The hood reinforcement structure of claim 1, wherein the rear flange is configured for attachment to a portion of the inner hood structure proximate to the rigid front fascia.

3. The hood reinforcement structure of claim 1, wherein the reinforcement extension further comprises a rib structure for an upper profile of the rigid front fascia.

4. The hood reinforcement structure of claim 3, wherein the rib structure is structured such that a bottom surface of the rib structure forms a clearance between the bottom surface of the rib structure and the rigid front fascia.

5. The hood reinforcement structure of claim 3, wherein the reinforcement extension further comprises:

a support leg extending from the rib structure towards the front of the inner hood structure; and a support tab positioned to comprise a laterally outer edge of the hood reinforcement structure, wherein the support tab extends towards the rear of the inner hood structure from the rib structure and is continuous with the rear flange.

6. The hood reinforcement structure of claim 1, wherein the reinforcement extension is a first reinforcement extension that extends laterally away from a first lateral edge of the main reinforcement, the hood reinforcement structure further comprising a second reinforcement extension that extends laterally away from a second opposite lateral edge of the main reinforcement.

7. The hood reinforcement structure of claim 1, wherein the rigid front fascia comprises a headlight frame or profile.

8. The hood reinforcement structure of claim 1, wherein the main reinforcement comprises a plurality of attachment tabs.

9. The hood reinforcement structure of claim 8, wherein each of the plurality of attachment tabs is configured for attachment to a portion of the inner hood structure.

10. The hood reinforcement structure of claim 8, wherein a first subset of the plurality of attachment tabs extend towards a rear of the inner hood structure and a second subset of the plurality of attachment tabs extend towards a front of the inner hood structure.

11. The hood reinforcement structure of claim 10, wherein the rigid front fascia comprises a first rigid front fascia feature and wherein the first subset of the plurality of attachment tabs are evenly spaced between the first rigid front fascia feature and a second rigid front fascia feature of the rigid front fascia.

12. The hood reinforcement structure of claim 10, wherein the second subset of the plurality of attachment tabs comprise a primary attachment tab aligned with the center of the inner hood structure and a pair of secondary attachment tabs positioned proximate to a pair of lateral edges of the main reinforcement.

13. A front portion of a hood assembly comprising:

an outer hood structure;

an inner hood structure; and a hood reinforcement structure comprising:

a main reinforcement configured to be arranged between the outer hood structure and the inner hood structure; and a reinforcement extension that extends laterally away from the main reinforcement and comprises a rear flange configured to extend rearward over a rigid front fascia, wherein a central attachment point of the rear flange is aligned with a center of the rigid front fascia.

14. The front portion of the hood assembly of claim 13, wherein the outer hood structure comprises a continuous metal sheet shaped to cover an opening in a front portion of a vehicle body.

15. The front portion of the hood assembly of claim 13, wherein at least a front section of the outer hood structure is fixedly attached to a front section the inner hood structure.

16. The front portion of the hood assembly of claim 13, wherein the rigid front fascia comprises a first rigid front fascia feature and wherein the hood reinforcement structure is fixedly attached to a front section of the inner hood structure corresponding to an area between the first rigid front fascia feature and a second rigid front fascia feature.

17. The front portion of the hood assembly of claim 13, wherein the reinforcement extension further comprises:

a rib structure configured to accommodate an upper profile of a rigid front fascia feature of the rigid front fascia.

18. The front portion of the hood assembly of claim 13, wherein the reinforcement extension is a first reinforcement extension that extends laterally away from a first lateral edge of the main reinforcement, the hood reinforcement structure further comprising a second reinforcement extension that extends laterally away from a second opposite lateral edge of the main reinforcement.

19. A vehicle comprising:

a front bay;

a rigid front fascia; and a hood assembly shaped to accommodate the rigid front fascia and positioned to cover the front bay, the hood assembly comprising:

an outer hood structure;

an inner hood structure; and a vehicle hood reinforcement structure comprising:

a main reinforcement configured to be arranged between the outer and inner hood structures; and a reinforcement extension that extends laterally away from the main reinforcement and comprises a rear flange configured to extend rearward over the rigid front fascia, wherein a central attachment point of the rear flange is aligned with a center of the rigid front fascia.

* * * * *